(12) United States Patent
Aoyama

(10) Patent No.: US 6,297,617 B1
(45) Date of Patent: Oct. 2, 2001

(54) BATTERY CHARGER AND CHARGE CONTROL CIRCUIT

(75) Inventor: Takashi Aoyama, Aichi-ken (JP)

(73) Assignee: Kabushiki Kaisha Toyoda Jidoshokki Seisakusho, Kariya (JP)

( * ) Notice: Subject to any disclaimer, the term of this patent is extended or adjusted under 35 U.S.C. 154(b) by 0 days.

(21) Appl. No.: 09/654,490

(22) Filed: Sep. 5, 2000

(30) Foreign Application Priority Data

Sep. 7, 1999 (JP) ................... 11-253036

(51) Int. Cl.$^7$ ........................... H02J 7/00
(52) U.S. Cl. ........................... 320/128; 320/127
(58) Field of Search ................... 320/128, 127, 320/156, 157, 161, 152

(56) References Cited

U.S. PATENT DOCUMENTS 5,710,506 * 1/1998 Broell et al. ............... 320/145
6,204,633 * 3/2001 Kitagawa ................... 320/128

FOREIGN PATENT DOCUMENTS 10-14127  1/1998 (JP).

OTHER PUBLICATIONS

LT1505, Linear Technology, Constant–Current/Voltage High Efficiency Battery Charger, pp. 1–2. Apr. 10, 2000.
MAX1647MAX1648, Maxim Integrated Products, Chemistry–Independent Battery Chargers, pp. 1–24, and p. 15. Dec. 1996.

* cited by examiner

Primary Examiner—Peter S. Wong
Assistant Examiner—Lawrence Luk
(74) Attorney, Agent, or Firm—Morgan & Finnegan, LLP

(57) ABSTRACT

A switch is controlled by a charging control unit. An inductor is provided between the switch and a secondary battery. An offset generation unit generates voltage V2 by adding an offset voltage $V_{os}$ to voltage V1, where the voltage V1 corresponds to an inductor current. A current detection unit detects the inductor current based on the voltage V2. A voltage detection unit detects output voltage $V_{out}$. A charging control unit controls the switch based on the inductor current detected by the current detection unit and the output voltage $V_{out}$ detected by the voltage detection unit.

8 Claims, 7 Drawing Sheets

BATTERY CHARGER AND CHARGE CONTROL CIRCUIT

BACKGROUND OF THE INVENTION

1. Field of the Invention

The present invention relates to a battery charger for charging a secondary battery and a charge control circuit for controlling the charging operation.

2. Description of the Related Art

A secondary battery is used in a variety of equipment, such as a note-size personal computer, a communications equipment, a video camera, etc. Therefore, as a natural consequence, a battery charger for charging these secondary batteries has been widely used.

When a secondary battery is charged, voltage to be applied to the secondary battery or current to be supplied to the secondary battery is usually used as a parameter for controlling the charging operation. As the prior art, for example, there is a method in which a charging operation is divided into two processes. In the former process a secondary battery is charged almost up to the full-charged state while supplied current is maintained constant, and in the latter process the secondary battery is charged until the full-charged state while supplied voltage is maintained constant, is widely known.

FIG. 1 shows an example of a conventional battery charger. This battery charger is generally called an "asynchronous rectification type" battery charger.

A voltage detection unit 101 detects output voltage (voltage applied to a secondary battery 200). A current detection unit 102 detects an inductor current or its average value (current supplied to the secondary battery 200) by monitoring a voltage generated across a resistor R connected in series to an inductor L. A charging control unit 103 controls a switch (MOS transistor) M1 based on the output voltage detected by the voltage detection unit 101 and the inductor current detected by the current detection unit 102. Here, if it is assumed that the switch M1 is driven by a PWM (pulse width modulation) control method, a control signal supplied to the switch M1 is a pulse signal with a specific frequency. The charging control unit 103 adjusts the duty cycle of the pulse signal based on the output voltage and the inductor current.

A prescribed DC voltage generated by an AC adaptor (AC/DC converter) is supplied to the switch M1. Therefore, while the switch M1 is ON (closed), as shown in FIG. 2, the inductor current increases as time elapses. During this period, the inductor current is supplied via the switch M1. While the switch M1 is OFF (opened), the inductor current decreases as time elapses. During this period, since the switch M1 is OFF, the inductor current is supplied via a diode D1.

In this circuit, the charging control unit 103 controls the switch M1 in such a way that the output voltage is maintained constant or in such a way that the average inductor current is maintained constant. As a result, the secondary battery 200 is charged with a constant voltage or a constant current.

FIG. 3 shows another embodiment of a conventional battery charger. This battery charger is generally called a "synchronous rectification type" battery charger.

The synchronous rectification type charger shown in FIG. 3 can be basically implemented by replacing a diode D1 with a switch M2 in the charger shown in FIG. 1. The switches M1 and M2 are synchronously driven in such a way that the switches are not simultaneously turned on. Here, when the inductor current flows in a reverse direction, the current detection unit 102 cannot detect the inductor current correctly, if it does not have a function to detect a negative inductor current. Therefore, this battery charger has a diode D2 to prevent the reverse inductor current.

The operation of this synchronous rectification type battery charger is basically the same as that of the asynchronous rectification type one shown in FIG. 1. Specifically, while the switches M1 and M2 are ON and OFF, respectively, the inductor current increases as time elapses. During this period, the inductor current is supplied via the switch M1. While the switches M1 and M2 are OFF and ON, respectively, the inductor current decreases as time elapses. During this period, the inductor current is supplied via the switch M2.

In the above circuit, the charging control unit 103 synchronously controls the switches M1 and M2 in such a way that the output voltage is maintained constant or in such a way that the average inductor current is maintained constant. As a result, the secondary battery 200 is charged with a constant voltage or a constant current.

In the asynchronous rectification type battery charger shown in FIG. 1, as described above, the inductor current is supplied via the diode D1 while the switch M1 is OFF. However, the on-resistance of a diode is generally fairly large compared with that of a MOS transistor, etc. Therefore, when current flows through the diode D1, there is fairly large voltage drop, and as a result, a large amount of heat is generated and wasted.

In the synchronous rectification type battery charger shown in FIG. 3, the heat problem of the diode D1 can be solved by replacing the diode D1 with a MOS transistor. However, since the diode D2 is provided, a large amount of heat and an extra voltage drop on a charging route are generated by the diode D2, which is a new problem. In addition, since the reverse inductor current is prevented in conventional battery chargers shown in FIG. 1 and FIG. 3, there are following problems.

When the secondary battery 200 is charged up to almost full-charged state, charging current is controlled by the charging control unit 103 to decrease in such a way that the output voltage can be prevented from rising beyond a target value. As a result, the average inductor current becomes small or almost 0(zero). At this time, if a prevent function which prevents a reverse inductor current is not provided, the waveform of the inductor current becomes continuous as shown in FIG. 4A. However, if the prevent function is provided as shown in FIG. 1 or FIG. 3, a period in which a charging cycle is not performed is needed in order to make the average inductor current small or almost 0(zero) and to prevent the output voltage from rising beyond the target value. In this case, as shown in FIG. 4B, charging cycle is performed discontinuously. Therefore, the waveform of the inductor current becomes discontinuous, as shown in FIG. 4B.

In other words, if a prevent function which prevents a reverse inductor current is not provided, the secondary battery 200 is always charged with a constant cycle, regardless of the charging state of the secondary battery 200. However, if the prevent function is provided as shown in FIG. 1 or FIG. 3, the charging cycle changes according to the charging state of the secondary battery 200.

In addition, since the inductor current can be more easily averaged when an inductor current waveform to be detected is continuous than when an inductor current waveform to be detected is discontinuous, the detection accuracy of the average inductor current generally becomes low if the prevent function is provided. Therefore, if the target value of a charging current is set to a value lower than the ripple of the inductor current while the prevent function is provided, an inductor current waveform becomes discontinuous. Accordingly, the detection accuracy of the average inductor current decreases and there is a possibility that the deviation from the target value of the charging current may become large.

SUMMARY OF THE INVENTION

It is an object of the present invention to provide a battery charger and a charging control circuit which operates with a constant cycle, regardless of the charging state of the secondary battery. It is another object of the present invention to provide a battery charger and a charging control circuit which prevents charging current accuracy from decreasing against any target charging current.

The charging control circuit of the present invention controls the operation of a battery charger including a switch to which DC voltage is applied and an inductor connected to the switch. This charging control circuit comprises the following units. An offset unit adds an offset to a signal corresponding to an inductor current. A conversion unit generates a current corresponding to the signal to which the offset is added. A correction unit eliminates an effect due to the offset from the current generated by the conversion unit. A controller controls the switch based on the current corrected by the correction unit.

In the charging control circuit, a signal inputted to the conversion unit can be adjusted to an arbitrary level according to the offset. Therefore, the conversion unit can always receive a signal with a suitable input level for the conversion unit, then a current correctly corresponding to the input signal is always generated. In addition, although the output of the conversion unit includes the effect due to the offset, this effect is eliminated by the correction unit. Therefore, the current corrected by the correction unit correctly corresponds to the inductor current.

In a charging control circuit of the present invention, there is no need to prevent reverse inductor current, since the conversion unit can always receive a signal with a suitable level for the conversion unit by way of providing the offset unit. Therefore, the conventional problems due to preventing the reverse inductor current can be avoided.

DESCRIPTION OF THE PREFERRED EMBODIMENTS

The preferred embodiments of the present invention are described below with reference to the drawings.

Figure 3:
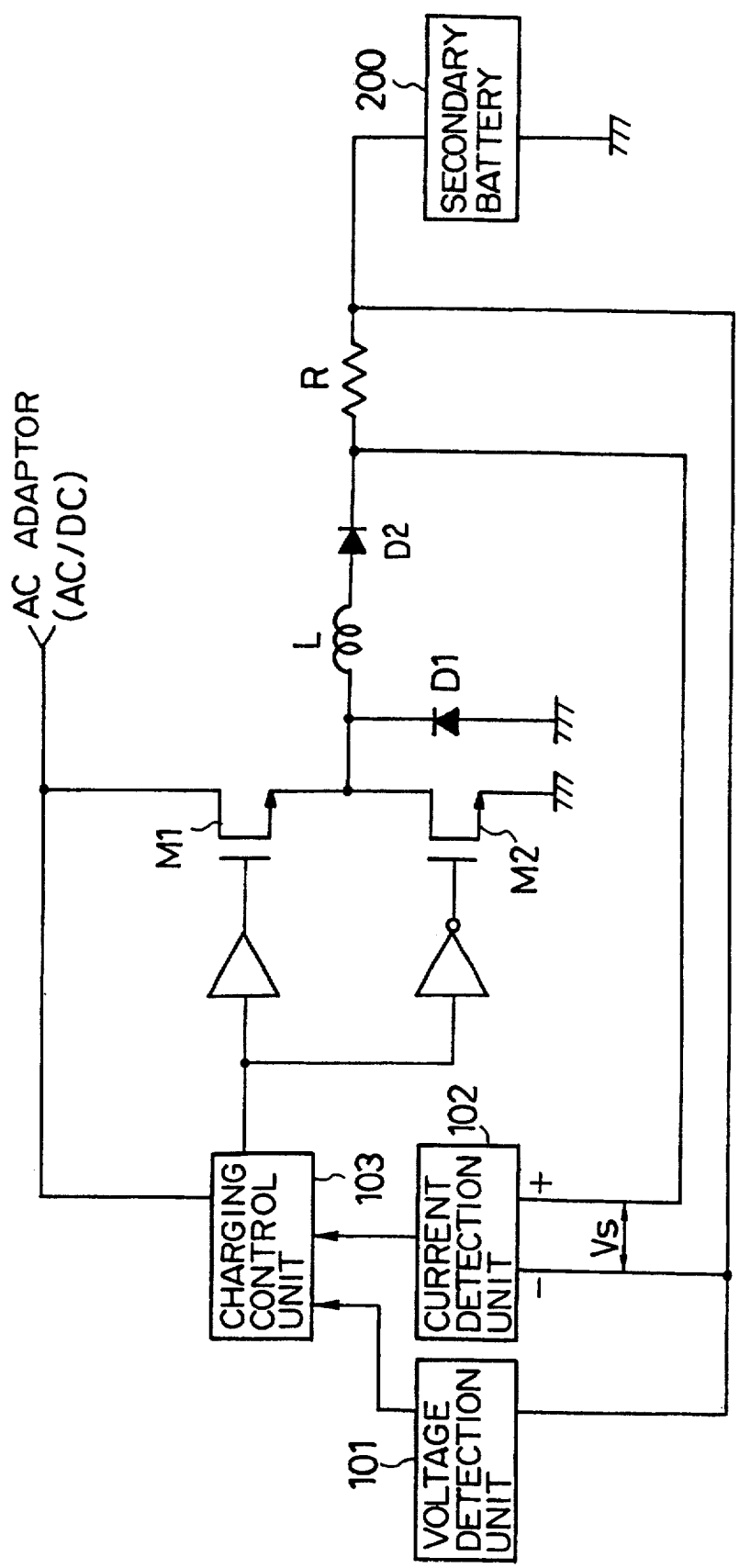
FIG. 3 shows another embodiment of a conventional battery charger.
Figure 5:
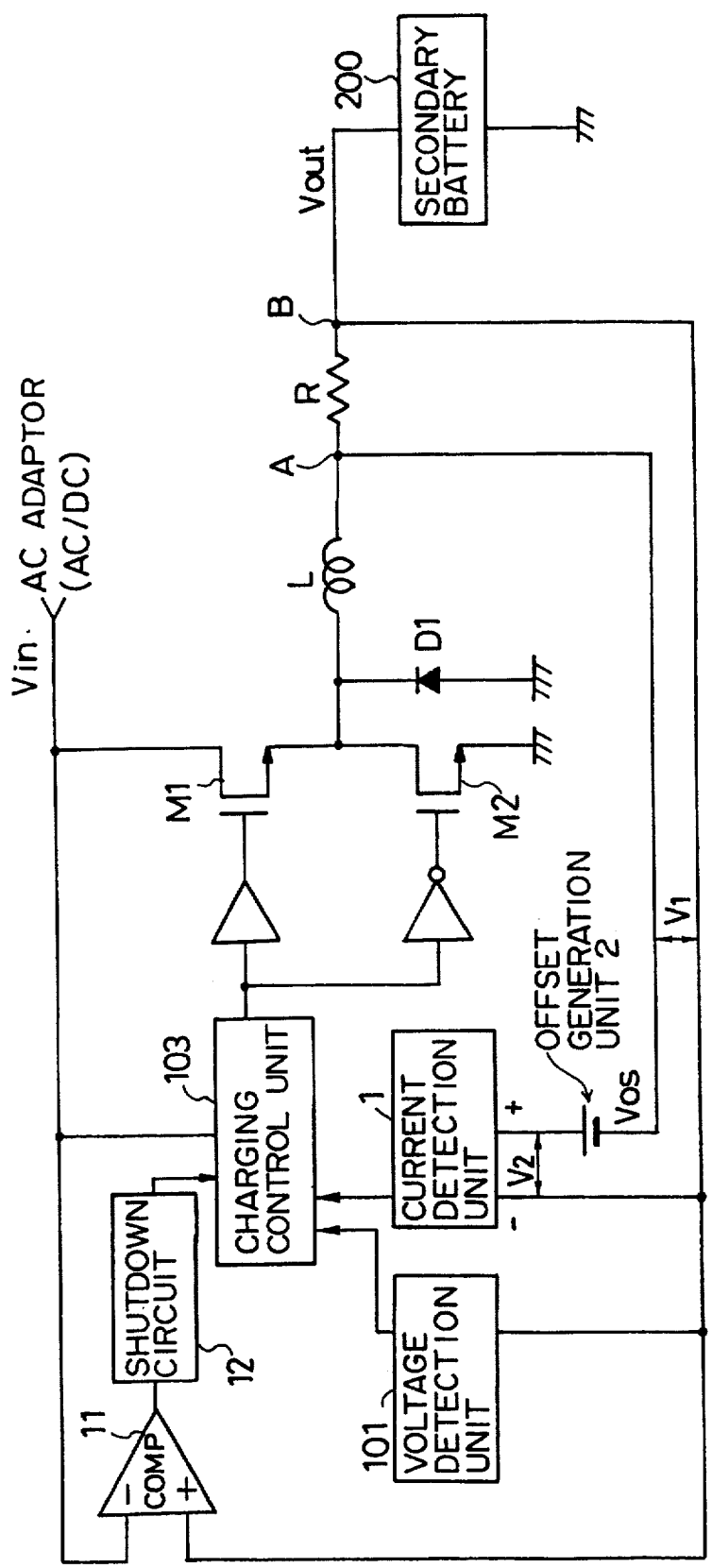
FIG. 5 shows a preferred embodiment of the present invention.

FIG. 5 shows a battery charger of a preferred embodiment of the present invention. The numeral references and symbols used in FIG. 5 that are the same ones as those used in FIG. 3 indicate the same circuits or elements in FIG. 3. That is to say, for a voltage detection unit 101, a charging control unit 103 and switches M1 and M2, an inductor L and a resistor R, the conventional circuits or parts shown in FIG. 3 can basically be used. In addition, since the basic operation of this battery charger is the same as that of shown in FIG. 3, the description of operation given with reference to FIG. 3 is omitted here.

The battery charger of this preferred embodiment adopts a synchronous rectification method in order to suppress the heat generation. In addition, this charger does not use a reverse current preventing diode (the diode D2 shown in FIG. 3) in order to avoid the conventional technical problems which are described with reference to FIGS. 4A and 4B.

Figure 1:
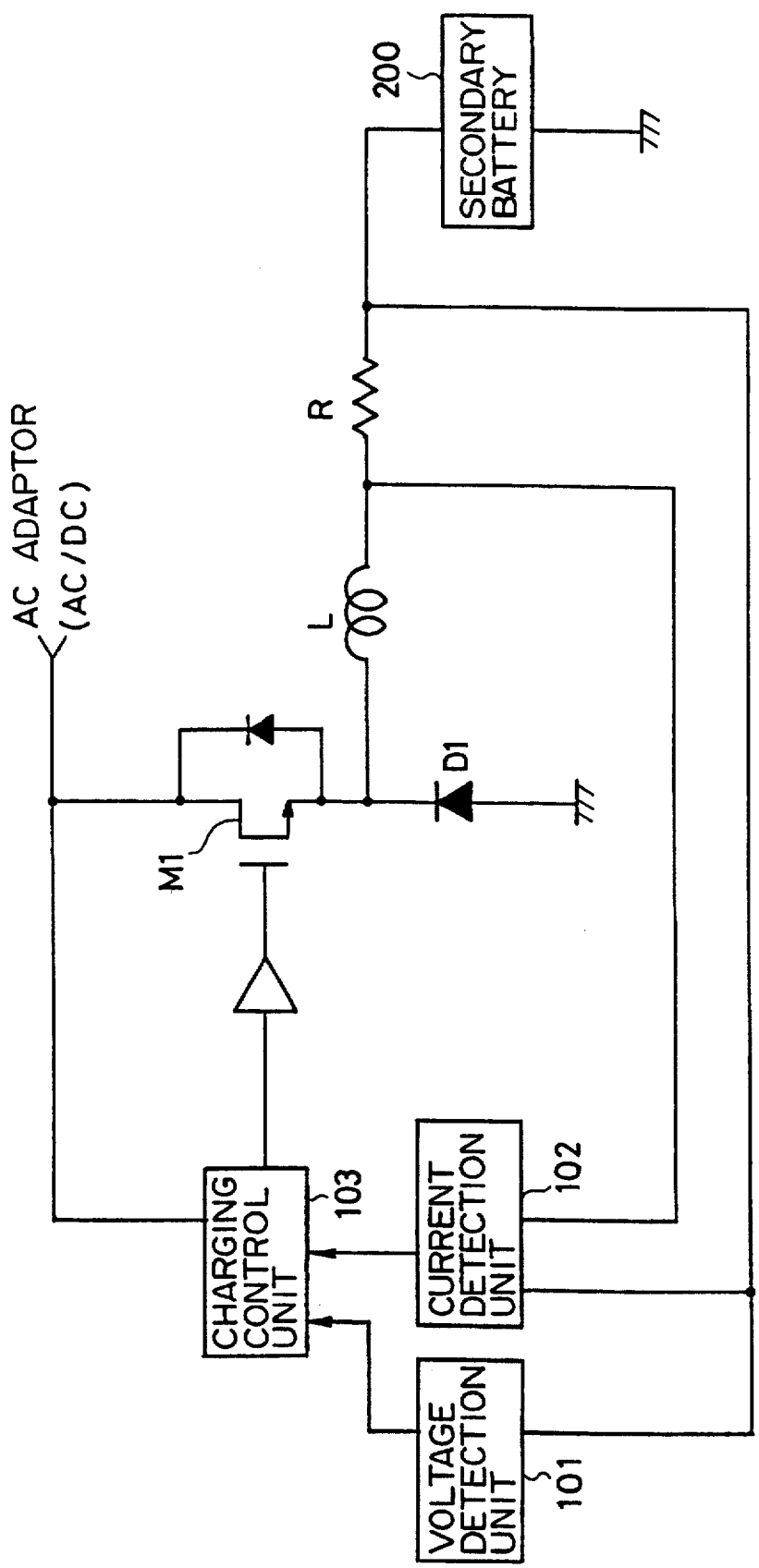
FIG. 1 shows an example of a conventional battery charger.
Figure 2:
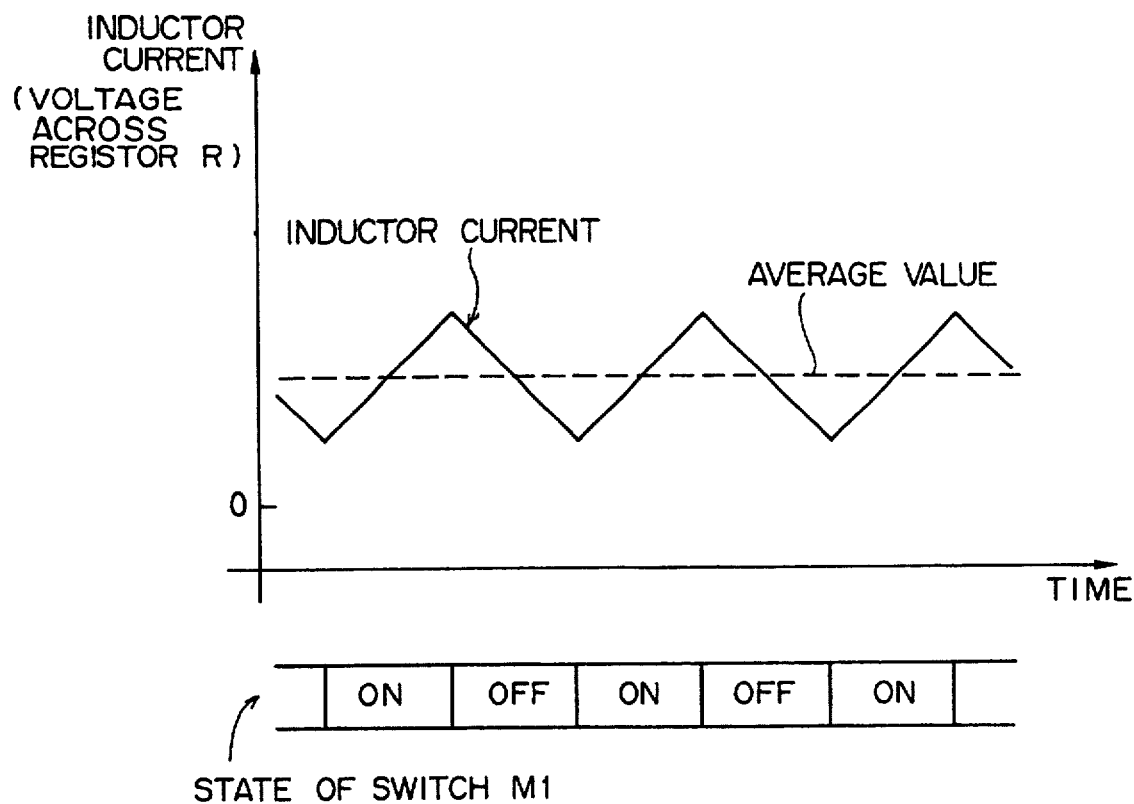
FIG. 2 shows an inductor current in a battery charger.

A current detection unit 1 detects an inductor current or its average value by monitoring a voltage generated across the resistor R. This current detection unit 1 is provided with a correction function to eliminate an effect of an offset generated by an offset generation unit 2, unlike the current detection unit 102 shown in FIGS. 1 and 3. This correction function is described in detail later.

The offset generation unit 2 adds an offset to a voltage across the resistor R. Specifically, the offset generation unit 2 generates voltage V2 by adding an offset voltage $V_{os}$ to the voltage V1. Then, the voltage V2 is inputted to the current detection unit 1. The offset voltage $V_{os}$ is a voltage which prevents the voltage V2 inputted to the current detection unit 1 from being negative even if the inductor current flows backward. Here, "the voltage V2 inputted to the current detection unit 1 is negative" means a state where a potential supplied to the negative terminal of the current detection unit 1 is higher than a potential supplied to the positive terminal. The configuration of the offset generation unit 2 is described later.

A comparator 11 compares an input voltage $V_{in}$ supplied from an AC adaptor (AC/DC converter) with an output voltage $V_{out}$ outputted from this battery charger. A shutdown circuit 12 stops the operation of the charging control unit 103 when the output voltage $V_{out}$ becomes higher than the input voltage $V_{in}$. If the charging control unit 103 is stopped, both of the switches M1 and M2 are turned off or at least the switch M1 is turned off.

In the above circuit, the voltage detection unit 101 detects the output voltage $V_{out}$. On the other hand, the current detection unit 1 detects an inductor current or its average value based on the voltage V2. Then, the charging control unit 103 controls the switches M1 and M2 based on the output voltage and the inductor current.

Figure 6:
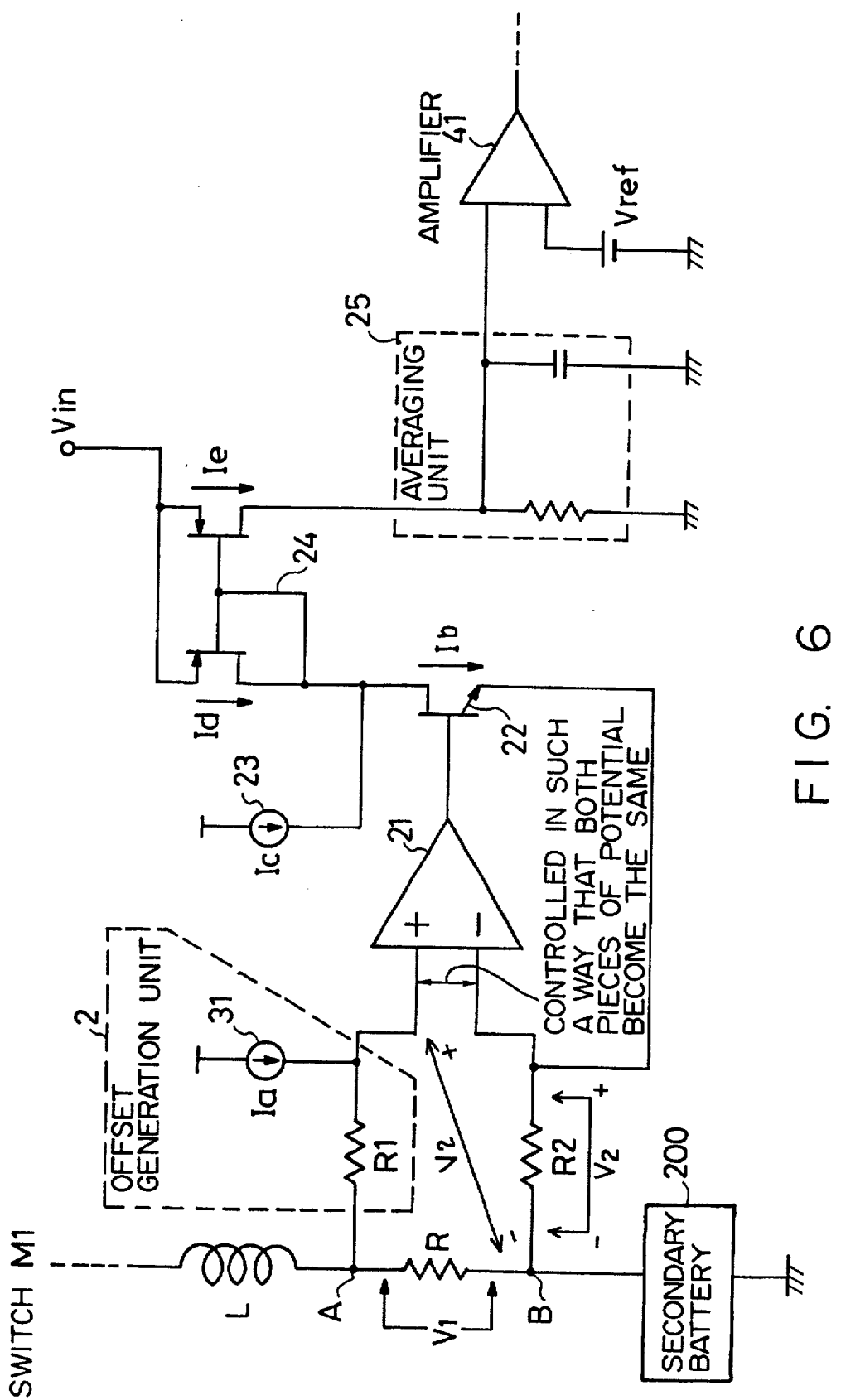
FIG. 6 shows a circuit diagram of a current detection unit and an offset generation unit.

FIG. 6 shows a circuit diagram of the current detection unit 1 and the offset generation unit 2. The current detection unit 1 comprises an amplifier 21, a transistor 22, a current source 23 and a current mirror circuit 24. The offset generation unit 2 comprises a current source 31.

The positive input terminal of the amplifier 21 is connected to one terminal (node A) of the resistor R via a resistor R1. The negative input terminal of the amplifier 21 is connected to the other terminal (node B) of the resistor R via a resistor R2. The output of the amplifier 21 controls the transistor 22. The output of this transistor 22 is fed back to the amplifier 21. Therefore, a current corresponding to the voltage V2 inputted to the amplifier 21 flows through the transistor 22.

Here, if a potential applied to the negative terminal of the amplifier 21 is lower than a potential at the node B, in other word, if the voltage V2 is negative, the amplifier 21 cannot generate a current corresponding to the voltage V2. Therefore, in the battery charger of this preferred embodiment, the voltage V2 is prevented from being negative by the offset generation unit 2, even if the potential of the node B is higher than the potential of the node A, in other word, even if an inductor current flows backward.

The offset generation unit 2 adds the offset voltage $V_{os}$ to the positive terminal of the amplifier 21. Here, this offset voltage $V_{os}$ can be obtained by a voltage drop across the resistor R1 when current Ia flows through the resistor R1. Therefore, the offset voltage $V_{os}$ is expressed by the following equation (1). In addition, since the amplifier 21 controls the current Ib which flows through the transistor 22, in such a way that a potential of the positive terminal and a potential of the negative terminal match each other, the voltage V2 across the resistor R2 and the current Ib can be expressed by equations (2) and (3), respectively.

$$V_{os} = I_a \cdot R1 \qquad (1)$$

$$V2 = V1 + V_{os} = V1 + I_a \cdot R1 \qquad (2)$$

$$I_b = V2/R2 = (V1 + I_a \cdot R1)/R2 \qquad (3)$$

The current source 23 supplies current $I_c$ to the transistor 22. Therefore, a current $I_d$ which flows through a transistor in the input side of the current mirror circuit 24 can be expressed by equation (4). In addition, if the current ratio of the current mirror circuit 24 is assumed to be 1:1, a current $I_e$ which flows through a transistor in the output side of the current mirror circuit 24 can be expressed by equation (5).

$$I_c + I_d = I_b \qquad (4)$$

$$I_e = I_d = I_b - I_c \qquad (5)$$

Here, the resistance values of the resistors R1 and R2 are designed to be the same (R1=R2). In addition, the current generated by the current source 23 and that generated by the current source 31 are also designed to be the same ($I_a = I_c$). In this case, the current $I_e$ which flows through the transistor in the output side of the current mirror circuit 24 can be expressed by equation (6).

$$I_e = (V1 + I_a \cdot R1)/R2 - I_c \qquad (6)$$

$$= V1/R2$$

Furthermore, if a current which actually flows through the inductor L is assumed $I_{ind}$, the voltage across the resistor R can be expressed by equation (7). Therefore, the current $I_e$ which flows through the transistor in the output side of the current mirror circuit 24 can be expressed by equation (8).

$$V1 = R \cdot I_{ind} \qquad (7)$$

$$I_e = I_{ind}(R/R2) \qquad (8)$$

As described above, the current $I_e$ which flows through the transistor in the output side of the current mirror circuit 24 is proportional to the current $I_{ind}$ which flows through the inductor L. Therefore, the current $I_{ind}$ which flows through the inductor L can be detected based on the output of the current mirror circuit 24. In other words, although the offset voltage $V_{os}$ is added to the voltage V1 which corresponds directly to the inductor current in this battery charger, the effect due to the offset voltage $V_{os}$ is eliminated by the current $I_c$ generated by the current source 23. As a result, the current detection unit 1 can correctly detect a current which flows through the inductor L.

The output current of the current mirror circuit 24 is supplied to an averaging unit 25. The averaging unit 25 has a general configuration including a resistor and a capacitor, and outputs the voltage of the capacitor. The averaging unit 25 can be provided in the current detection unit 1 or the charging control unit 103.

The output of the averaging unit 25 is supplied to an amplifier 41 provided in the charging control unit 103. This amplifier 41 is supplied with a reference voltage $V_{ref}$ and generates a signal corresponding to the output of the averaging unit 25. Specifically, the amplifier 41 generates a signal corresponding to the average of the inductor current. Then, the output of this amplifier 41 is used to generate a signal for controlling the switches M1 and M2. Specifically, for example, if the switches M1 and M2 are controlled by a PWM method, the duty cycle of a pulse signal for controlling the switches M1 and M2 is determined by the output of the amplifier 41.

As described above, in the battery charger of this preferred embodiment, a current detection unit, which was originally designed not to be able to detect a negative inductor current, can detect a negative inductor current with a level where the negative inductor current can be compensated by the offset, by adding the offset to the voltage across the resistor R. In addition, the output of the current detection unit 1 can be made to be the same as that obtained when offset is not applied, by providing a function to eliminate the effect due to the offset. Therefore, the conventional charging control unit can be used without modification for the charging control unit 103.

Next, the operation of detecting inductor current in the battery charger of this preferred embodiment is described.

Figure 4A:
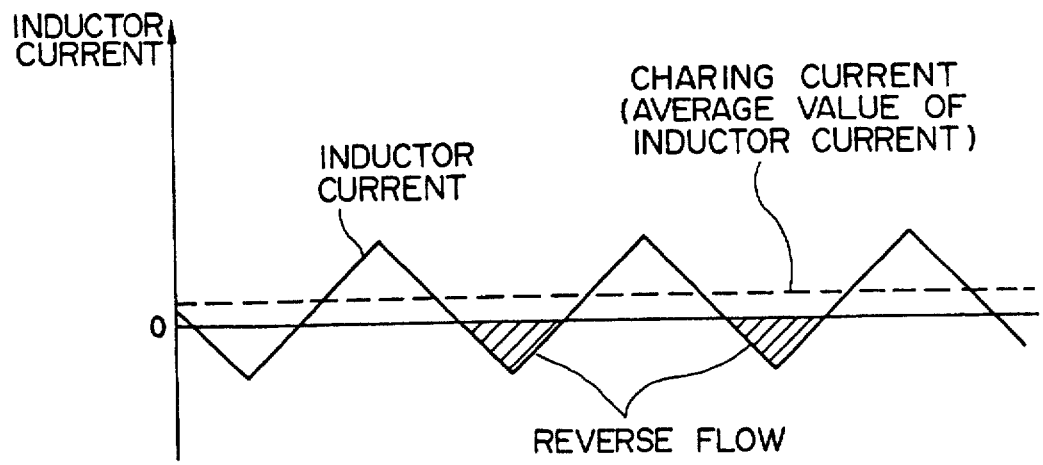
FIGS. 4A and 4B are diagrams for explaining conventional technical problems.
Figure 4B:
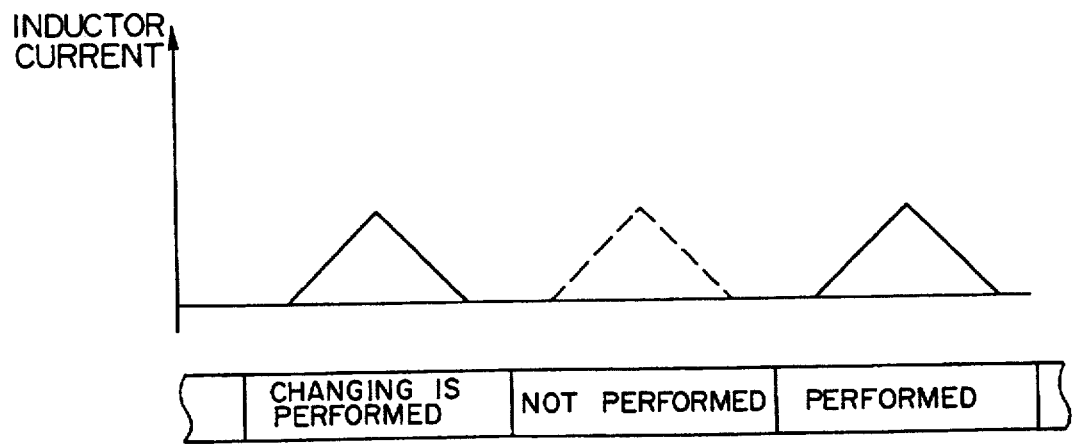

As shown in FIG. 5, this battery charger is not provided with a reverse current preventing diode. Therefore, when the secondary battery 200 is charged close to the full-charged state, and an average inductor current becomes small or almost 0, a reverse inductor current flows discontinuously, as shown in FIG. 4A. At this time, however, while input voltage $V_{in}$ from the AC adaptor is higher than voltage $V_{out}$ applied to the secondary battery, the average value of the inductor current never drops below 0.

Figure 7A:
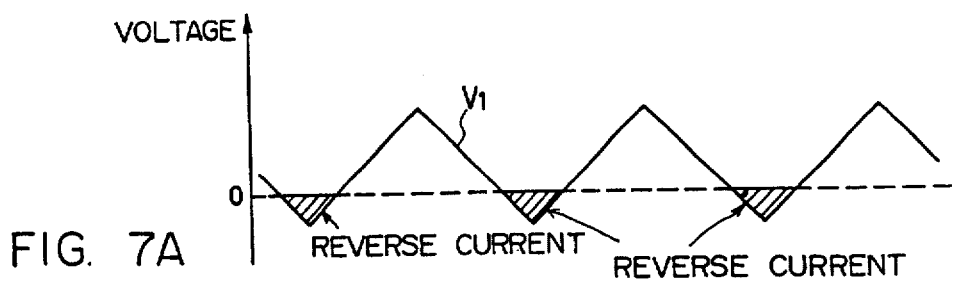
FIGS. 7A through 7C show an operation for detecting an inductor current.

The inductor current is monitored using the resistor R and the voltage V1 generated across the resistor R is a voltage which corresponds directly to the inductor current. Therefore, if the inductor current flows backward, the voltage V1 becomes negative, as shown in FIG. 7A.

Figure 7B:
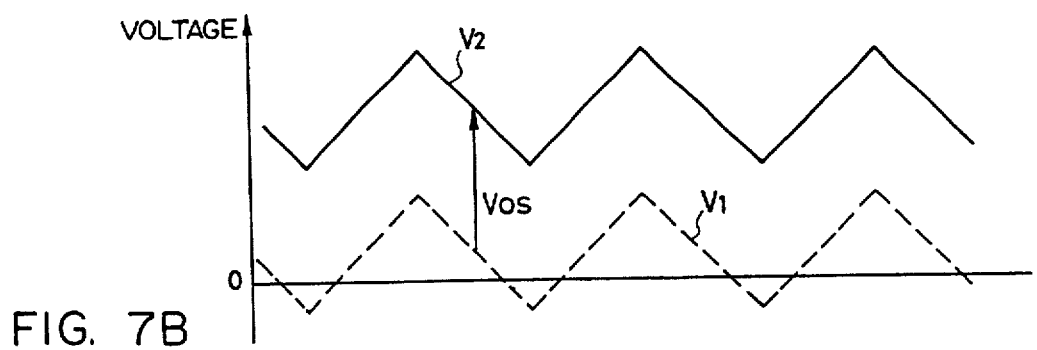

As shown in FIG. 7B, the offset generation unit 2 generates the voltage V2 by adding the offset voltage $V_{os}$ to the voltage V1. This offset voltage $V_{os}$ is set to a value larger than a ripple of the voltage V1. Then, even if the inductor current flows backward, the voltage V2 never becomes negative. That is to say, "negative voltage" is never inputted to the amplifier 21. The voltage V1 directly corresponds to the inductor current, and the ripple of the inductor current is determined based on input voltage from the AC adaptor, the output voltage of this battery charger, the switching frequency of the switches M1 and M2 and the inductance of the inductor L. Therefore, the ripple of the voltage V1 can be easily calculated based on the design of this battery charger, and the offset voltage $V_{os}$ can be determined based on the ripple.

Figure 7C:
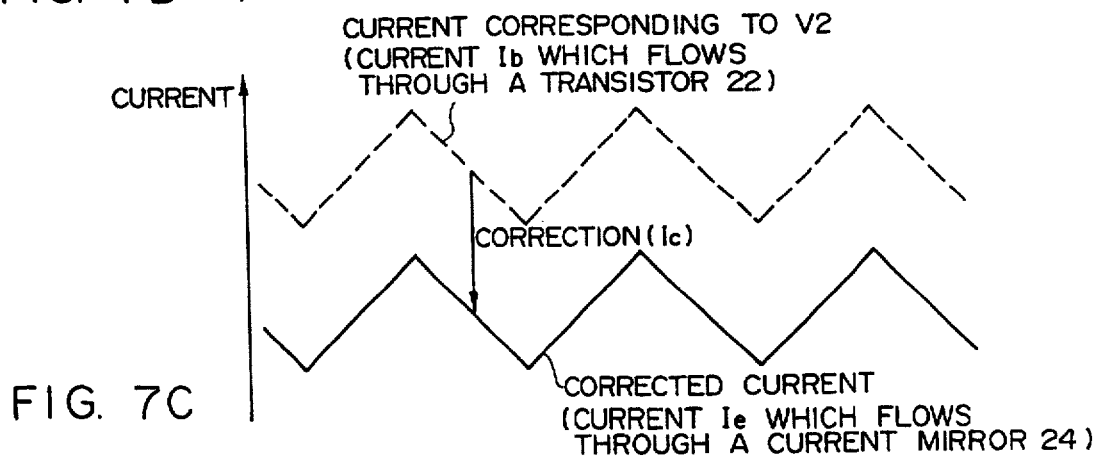

If the voltage V2 is applied to the amplifier 21, current $I_b$ flows through the transistor 22. At this time, the current detection unit 1 corrects this current $I_b$ using current $I_c$ generated by the current source 23, as shown in FIG. 7C. Then, the effect due to the offset voltage $V_{os}$ is eliminated from the output of the current detection unit 1 by this correction. The method for eliminating the effect due to the voltage $V_{os}$ has already been described with reference to FIG. 6.

Since the battery charger of this preferred embodiment is not provided with a reverse current preventing diode, the inductor current sometimes flows backward when the charging current becomes small. However, since an offset is added to a voltage which corresponds directly to the inductor current, the current detection unit 1 can always correctly detect the inductor current.

In addition, since a reverse current preventing diode is not provided, a switching operation is repeatedly performed without interruption, and charging is controlled with a constant cycle regardless of the charging state of the secondary battery 200.

If a reverse current preventing diode is not provided, there is a possibility that a current may flow through the inductor L and the parasitic diode of the switch M1 from the secondary battery 200, when input voltage $V_{in}$ becomes lower than output voltage $V_{out}$. However, in this battery charger, the shutdown circuit 12 stops the operation of the charging control circuit 103 if the input voltage $V_{in}$ becomes lower than the output voltage $V_{out}$. Here, if the operation of the charging control unit 103 is stopped, at least the switch M1 is turned off. Therefore, the current described above does not flow.

Since there is no need to prevent a reverse inductor current, a switching frequency can be stabilized. In addition, since circuits or parts used to prevent the reverse inductor current are unnecessary, cost can also be reduced.

What is claimed is:

1. A charging control circuit for controlling an operation of a battery charger including a switch to which DC voltage is applied and an inductor connected to the switch, comprising:

offset means for adding an offset to a signal corresponding to an inductor current;

conversion means for generating a current corresponding to the signal to which the offset is added;

correction means for eliminating an effect due to the offset from the current generated by said conversion means; and control means for controlling the switch based on the current corrected by said correction means.

2. The charging control circuit according to claim 1, wherein
   the offset is a value which prevents a polarity of voltage inputted to said conversion means from changing, regardless of a direction of inductor current.

3. The charging control circuit according to claim 1, wherein
   said correction means generates a correction current corresponding to the offset and eliminates the correction current from the current generated by said conversion means.

4. A charging control circuit for controlling an operation of a battery charger including a switch to which DC voltage is applied and an inductor connected to the switch, comprising:

an offset circuit adding an offset to a signal corresponding to an inductor current;

a conversion circuit generating a current corresponding to the signal to which the offset is added;

a correction circuit eliminating an effect due to the offset from the current generated by said conversion circuit; and a controller controlling the switch based on the current corrected by said correction circuit.

5. A charging control circuit for controlling an operation of a battery charger including a switch to which DC voltage is applied and an inductor connected to the switch, comprising:

a resistor which is connected to the inductor in series;

an amplifier which comprises a first input terminal and a second input terminal, the first input terminal being connected to one end of said resistor and the second input terminal being connected to the other end of said resistor;

an offset circuit applying an offset voltage to the first input terminal of said amplifier;

a feedback circuit generating a feedback signal based on an output of said amplifier in such a way that a potential of the first input terminal of said amplifier and a potential of the second input terminal of said amplifier become the same, and supplying the feedback signal to the second input terminal of said amplifier; and a controller controlling the switch based on the output of said feedback circuit.

6. The charging control circuit according to claim 5, wherein
   said controller controls the switch after eliminating an effect due to the offset from the output of said feedback circuit.

7. A battery charger including a switch to which DC voltage is applied and an inductor connected to the switch, comprising:

offset means for adding an offset to a signal corresponding to an inductor current;

conversion means for generating a current corresponding to the signal to which the offset is added;

correction means for eliminating an effect due to the offset from the current generated by said conversion means; and control means for controlling the switch based on the current corrected by said correction means.

8. A charging control method for controlling an operation of a battery charger including a switch to which DC voltage is applied and an inductor connected to the switch, comprising:

adding an offset to a signal corresponding to an inductor current;

generating a current corresponding to the signal to which the offset is added;

eliminating the effect due to the offset from the generated current; and controlling the switch based on the current from which the effect due to the offset has been eliminated.

* * * * *